United States Patent
Hung et al.

(10) Patent No.: US 11,547,537 B2
(45) Date of Patent: Jan. 10, 2023

(54) METHOD FOR PRODUCING DENTAL ADAPTIVE ELEMENT FOR ALLEVIATING RECESSION OF GINGIVA

(71) Applicants: Tsung-Fu Hung, New Taipei (TW); Po-Jan Kuo, New Taipei (TW); Hsin-Yu Kuo, New Taipei (TW); Seung-Jun Song, New York, NY (US)

(72) Inventors: Tsung-Fu Hung, New Taipei (TW); Po-Jan Kuo, New Taipei (TW); Hsin-Yu Kuo, New Taipei (TW)

(73) Assignees: Tsung-Fu Hung, New Taipei (TW); Po-Jan Kuo, New Taipei (TW); Hsin-Yu Kuo, New Taipei (TW); Seung-Jun Song, New York, NY (US)

( * ) Notice: Subject to any disclaimer, the term of this patent is extended or adjusted under 35 U.S.C. 154(b) by 179 days.

(21) Appl. No.: 17/074,216

(22) Filed: Oct. 19, 2020

(65) Prior Publication Data
US 2021/0113311 A1 Apr. 22, 2021

(30) Foreign Application Priority Data
Oct. 21, 2019 (TW) ................................ 108137892

(51) Int. Cl.
| A61C 13/00 | (2006.01) |
| A61C 13/34 | (2006.01) |
| A61C 8/00  | (2006.01) |
| A61C 9/00  | (2006.01) |
| B33Y 80/00 | (2015.01) |
| B33Y 10/00 | (2015.01) |
| B33Y 50/00 | (2015.01) |

(52) U.S. Cl.
CPC .......... A61C 13/0004 (2013.01); A61C 8/008 (2013.01); A61C 9/0053 (2013.01); A61C 13/34 (2013.01); B33Y 10/00 (2014.12); B33Y 50/00 (2014.12); B33Y 80/00 (2014.12)

(58) Field of Classification Search
CPC ... A61C 13/0004; A61C 8/008; A61C 9/0053; A61C 13/34; A61C 13/0001; A61C 13/26; B33Y 10/00; B33Y 50/00; B33Y 80/00
See application file for complete search history.

(56) References Cited

U.S. PATENT DOCUMENTS

2021/0153976 A1* 5/2021 Chen ...................... A61C 7/002

* cited by examiner

*Primary Examiner* — Rick K Chang
(74) *Attorney, Agent, or Firm* — Birch, Stewart, Kolasch & Birch, LLP (57) ABSTRACT

A method for producing a dental adaptive element for alleviating recession of gingiva around an alveolar socket of a patient includes: obtaining images of a tooth; creating a 3D model having a crown part and a root part based on the images; obtaining a boundary curve on the 3D model between the crown part and the root part; on the root part of the 3D virtual model, obtaining an imaginary surface that protrudes in a direction from the crown part toward the root part; extracting a sub-model from the 3D model by removing a portion of the root part that extends between the imaginary surface and an end of the root part; and producing a dental adaptive element according to the sub-model.

8 Claims, 14 Drawing Sheets

METHOD FOR PRODUCING DENTAL ADAPTIVE ELEMENT FOR ALLEVIATING RECESSION OF GINGIVA

CROSS-REFERENCE TO RELATED APPLICATION

This application claims priority of Taiwanese Invention Patent Application No. 108137892, filed on Oct. 21, 2019.

FIELD

The disclosure relates to a method for producing a dental adaptive element, and more particularly to a method for producing a dental adaptive element for alleviating recession of gingiva around an alveolar socket of a patient.

BACKGROUND

After extraction of a tooth of a patient, an alveolar socket, in which the tooth was originally embedded, is exposed. In general, tooth extraction results in the loss of 30%-60% of the volume of gingiva and alveolar bone around the alveolar socket in the first six months because of a natural reaction of the human body to absorb the gingiva and the alveolar bone, thereby causing recession of the gingiva. The recession of the gingiva and bone may compromise the placement of a dental implant, function, and aesthetics.

To alleviate the recession of the gingiva and bone, one known procedure is to place a temporary dental crown at an opening of the alveolar socket, thereby blocking the opening of the alveolar socket. However, conventional temporary dental crowns are designed to have standardized sizes and shapes. A dentist can only select one that matches the opening of the alveolar socket in question and most suitably fits the patient's gingiva. However, the fit may not be perfect so the selected conventional temporary dental crown may be too tight or too loose for the opening of the alveolar socket.

SUMMARY

Therefore, an object of the disclosure is to provide a method for producing a dental adaptive element for maintaining shape or alleviating recession of gingiva around an alveolar socket of a patient.

According to the disclosure, the method includes steps of:

obtaining, by a scanning equipment, images of a target tooth of the patient that is related to the alveolar socket;

creating, by a processing device, a three-dimensional (3D) virtual model based on the images of the target tooth, the 3D virtual model including a crown part and a root part connected to the crown part;

obtaining, by the processing device, a boundary curve between the crown part and the root part on the 3D virtual model;

obtaining, by the processing device, an imaginary surface on the root part of the 3D virtual model with reference to the boundary curve, the imaginary surface protruding in a direction from the crown part toward the root part;

extracting, by the processing device, a sub-model from the 3D virtual model by removing a portion of the root part that extends between the imaginary surface and a terminal end of the root part; and producing, by a 3D forming equipment, a dental adaptive element according to the sub-model.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
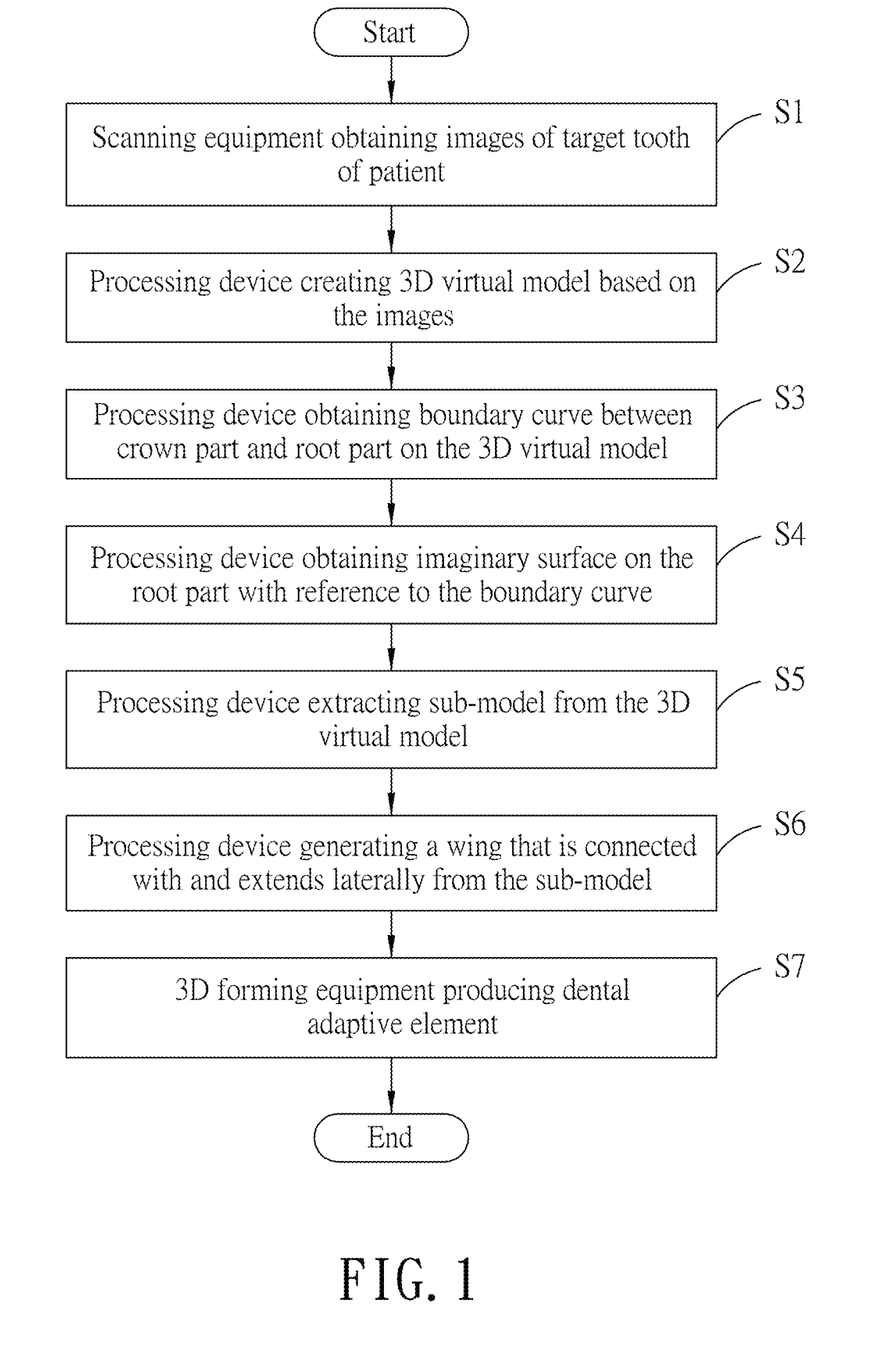
FIG. 1 is a flow chart exemplarily illustrating a method for producing a dental adaptive element for alleviating recession of gingiva according to an embodiment of the disclosure.

Referring to FIG. 1, a method for producing a dental adaptive element for alleviating recession of gingiva around an alveolar socket includes the steps as follows.

Figure 15:
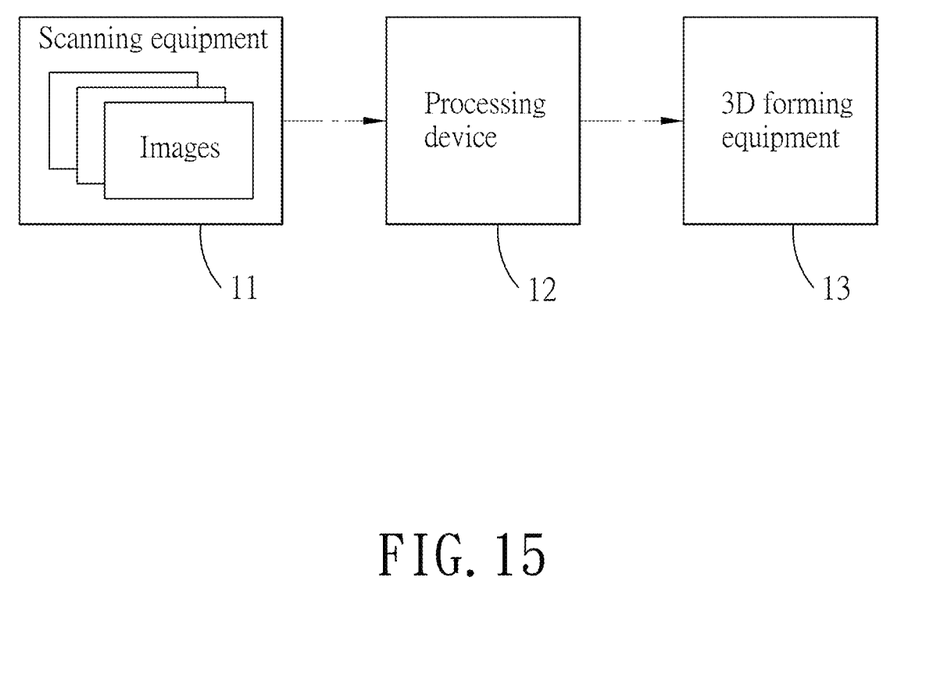
FIG. 15 is a block diagram exemplarily illustrating components of a system for implementing the method for producing a dental adaptive element according to an embodiment of this disclosure.

The method is implemented by, for example, a system shown in FIG. 15. The system of FIG. 15 includes a scanning equipment 11, a processing device 12 and a three-dimensional (3D) forming equipment 13.

Figure 4:
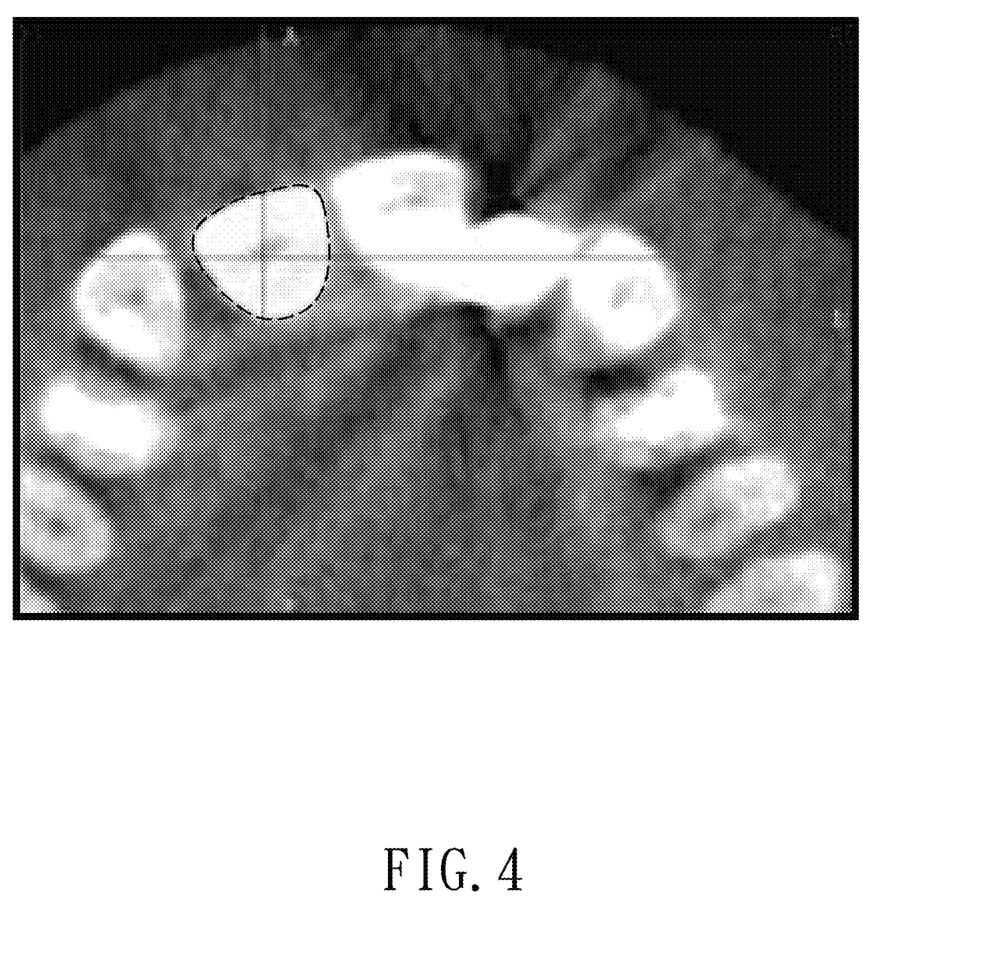
FIG. 4 is an axial view of a target tooth of a patient.
Figure 5:
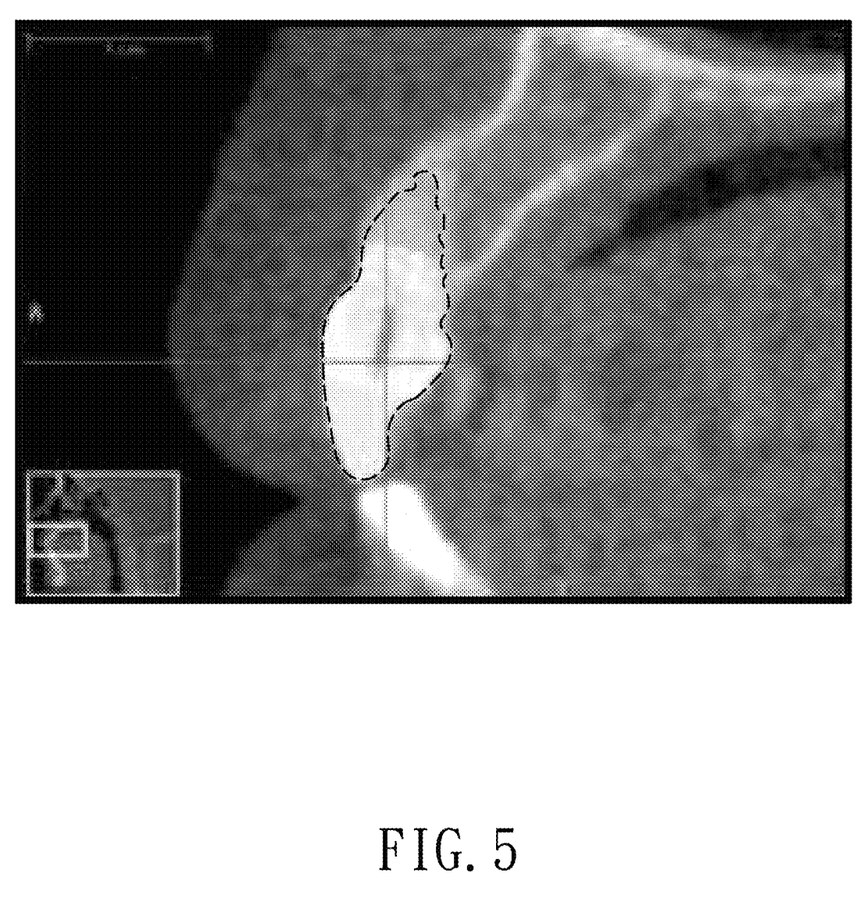
FIG. 5 is a sagittal view of the target tooth of the patient.
Figure 6:
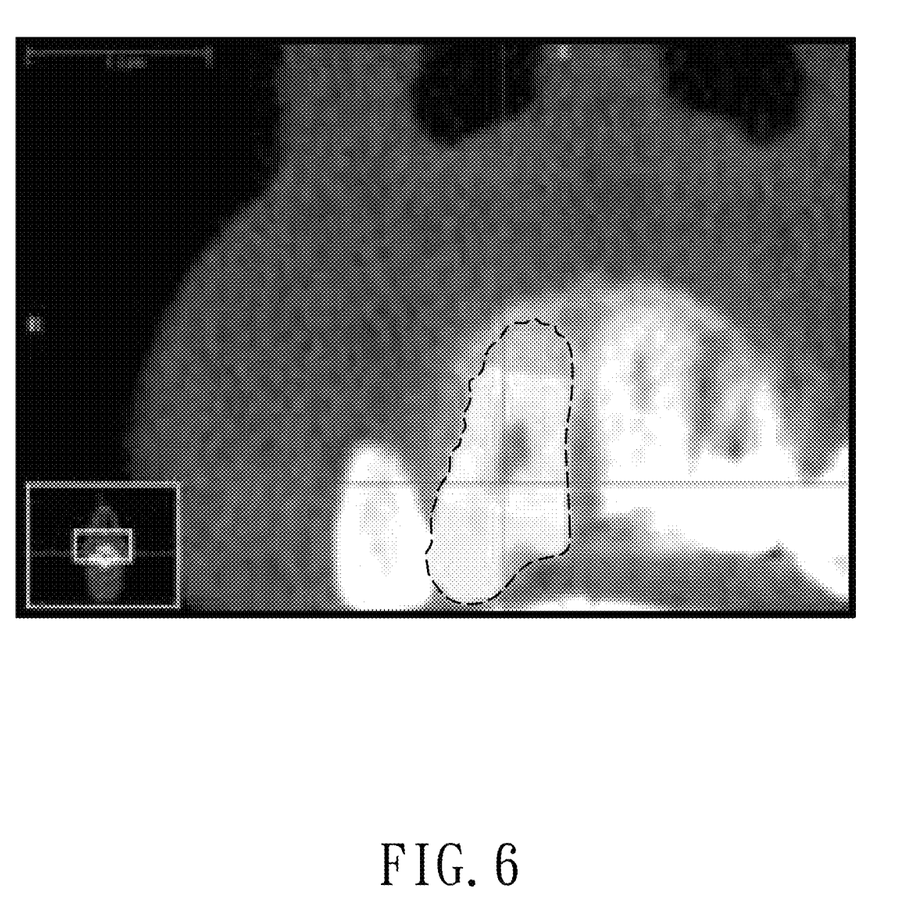
FIG. 6 is a coronal view of the target tooth of the patient.

In step S1 of the method, the scanning equipment 11 obtains images of a target tooth of a patient. According to some embodiments, the scanning equipment 11 is a cone beam computed tomography (CBCT) system for obtaining 3D images of the target tooth as shown in FIGS. 4 to 6.

The target tooth is in some way related to the alveolar socket. For example, in this embodiment, the target tooth is a to-be-treated tooth 21 of the patient that is embedded in an alveolar socket 20 (see FIGS. 2, 3 and 7); in this case, the target tooth is directly related to the alveolar socket. The method is to produce a dental adaptive element before extraction of the to-be-treated tooth 21 (i.e., the target tooth), and the dental adaptive element thus produced is used to block an opening 201 of the alveolar socket 20 that will be exposed after the extraction of the to-be-treated tooth 21.

Figure 7:
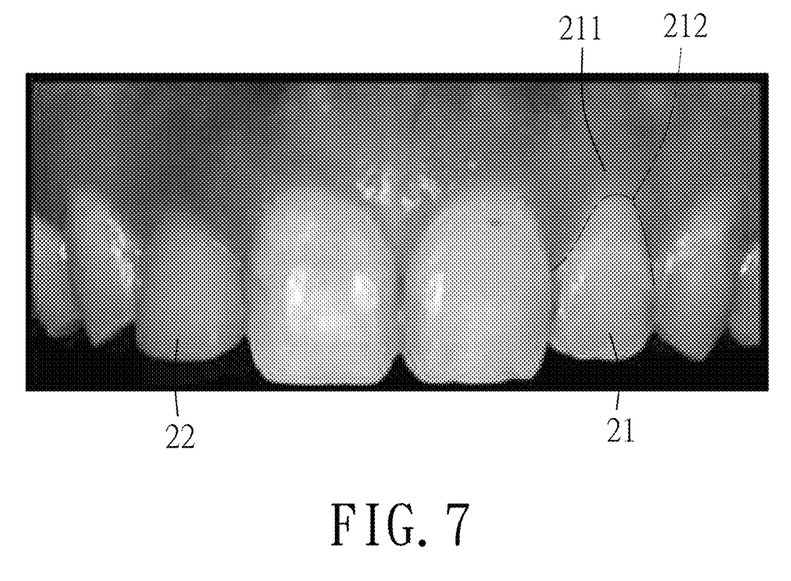
FIG. 7 is a picture showing a to-be-treated tooth on one side and a symmetric tooth on the other side.

In other embodiments where there is a missing tooth, a symmetric tooth that is located on the other side of the mouth and that is symmetric to the missing tooth may be designated as the target tooth; in this case, the target tooth is indirectly related to the alveolar socket. The dental adaptive element 4 is produced according to the symmetric tooth, and is used to block the opening of the alveolar socket at the location of the missing tooth. For example, in a case that the to-be-treated tooth 21 in FIG. 7 is missing, the symmetric tooth 22 that is symmetric to the to-be-treated tooth 21 is the target tooth.

Figure 8:
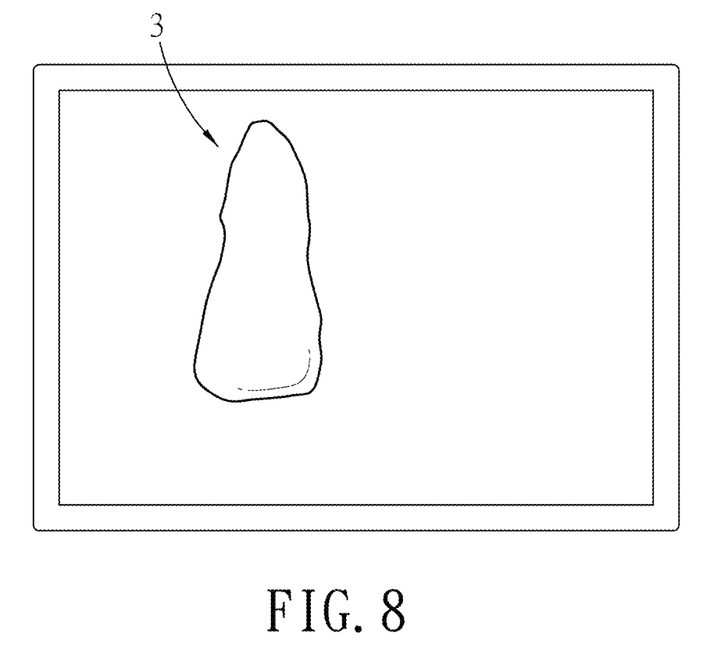
FIG. 8 is a schematic view of a three-dimensional (3D) virtual model of the to-be-treated tooth which serves as the target tooth in this embodiment.

In step S2, the processing device 12 creates a 3D virtual model 3 (see FIGS. 8 and 9) based on the images obtained in step S1. The 3D virtual model 3 includes a crown part 31 and a root part 32 connected to the crown part 31. Specifically, the crown part 31 and the root part 32 of the 3D virtual model 3 correspond to a crown and a root of the to-be-treated tooth 21 in this embodiment (or the missing tooth in the case where the dental adaptive element is to be placed at the location of the missing tooth), respectively.

The processing device 12 is, for example, a computer having a non-transitory memory that stores an image processing software (e.g., ITK-snap, OsiriX, or Blender, etc.), and a processing module (e.g., an integrated circuit chip, a programmable logic device, a Programmable Gate Array (PGA), a field-programmable gate array (FPGA), an Application Specific Integrated Circuit (ASIC), etc.) that is configured to execute the image processing software for creating the 3D virtual model 3.

It should be noted that, in the case that the symmetric tooth 22 is designated as the target tooth, the processing device 12, in step S2, would first create an initial 3D model that corresponds to and represents the symmetric tooth 22 based on the images of the target tooth, and then create a mirrored copy of the initial 3D model to serve as the 3D virtual model 3 that corresponds to the missing tooth.

In step S3, the processing device 12 obtains a boundary curve 33 between the crown part 31 and the root part 32 on the 3D virtual model 3. The boundary curve 33 corresponds to a boundary 212 (see FIG. 7) between, for example, a part of the to-be-treated tooth 21 that is exposed and the gingiva 211. In one embodiment, the processing device 12 analyzes the images obtained in step S1 to obtain the boundary curve 33. In some embodiments, an operator may manually mark a plurality of points between the crown part 31 and the root part 32 on the 3D virtual model 3, and the processing device then connects the marked points to obtain the boundary curve 33 or constructs the boundary curve 33 that has the best fit to the marked points.

Figure 9:
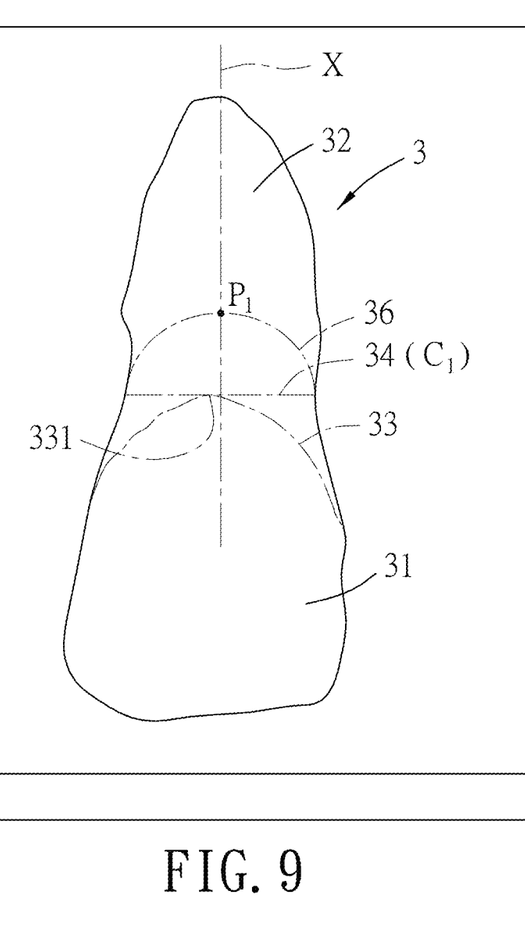
FIG. 9 is a schematic view of the 3D virtual model of the target tooth for illustrating an imaginary surface on the 3D virtual model.

Referring to FIG. 9, in step S4, the processing device 12 obtains an imaginary surface 36 on the root part 32 of the 3D virtual model 3 with reference to the boundary curve 33. The imaginary surface 36 protrudes in a direction from the crown part 31 toward the root part 32.

Specifically, the processing device 12 first obtains a tangent line 34 that touches a reference point 331 of the boundary curve 33 and that is perpendicular to a vertical axis (X) of the 3D virtual model 3. The reference point 331 is an extremity of the boundary curve 33 on a facial surface of the 3D virtual model 3. It should be noted that the facial surface means the labial side for an anterior tooth (e.g., incisors and canines), and means the buccal side for a posterior tooth (e.g., molars and premolars). The vertical axis (X) is defined in the coronal and apical directions of the tooth represented by the 3D virtual model 3, and may pass, for example, the centroid of the 3D virtual model 3.

The processing device 12 then obtains a cross section ($C_1$) that aligns with the tangent line 34 and that is perpendicular to the vertical axis (X), and obtains the imaginary surface 36 by defining a surface that protrudes from the cross section ($C_1$) toward the root part 32 as the imaginary surface. The cross section of the imaginary surface 36 viewed from a direction perpendicular to the vertical axis (X) has a shape substantially of two interconnecting line segments that form a point angle, or is substantially a smooth curve (e.g., a semicircle curve, a semi-elliptical curve, a semi-oval curve).

In this embodiment, the imaginary surface 36 has a semi-elliptical cross section, and the processing device 12 defines the imaginary surface 36 based on the cross section ($C_1$), the vertical axis (X) and a selected point ($P_1$) on the vertical axis (X). Specifically, a major axis of the semi-elliptical cross section of the imaginary surface 36 lies on the cross section ($C_1$), a semi-minor axis thereof is aligned with the vertical axis (X), and a co-vertex thereof is coincident with the selected point ($P_1$).

Figure 10:
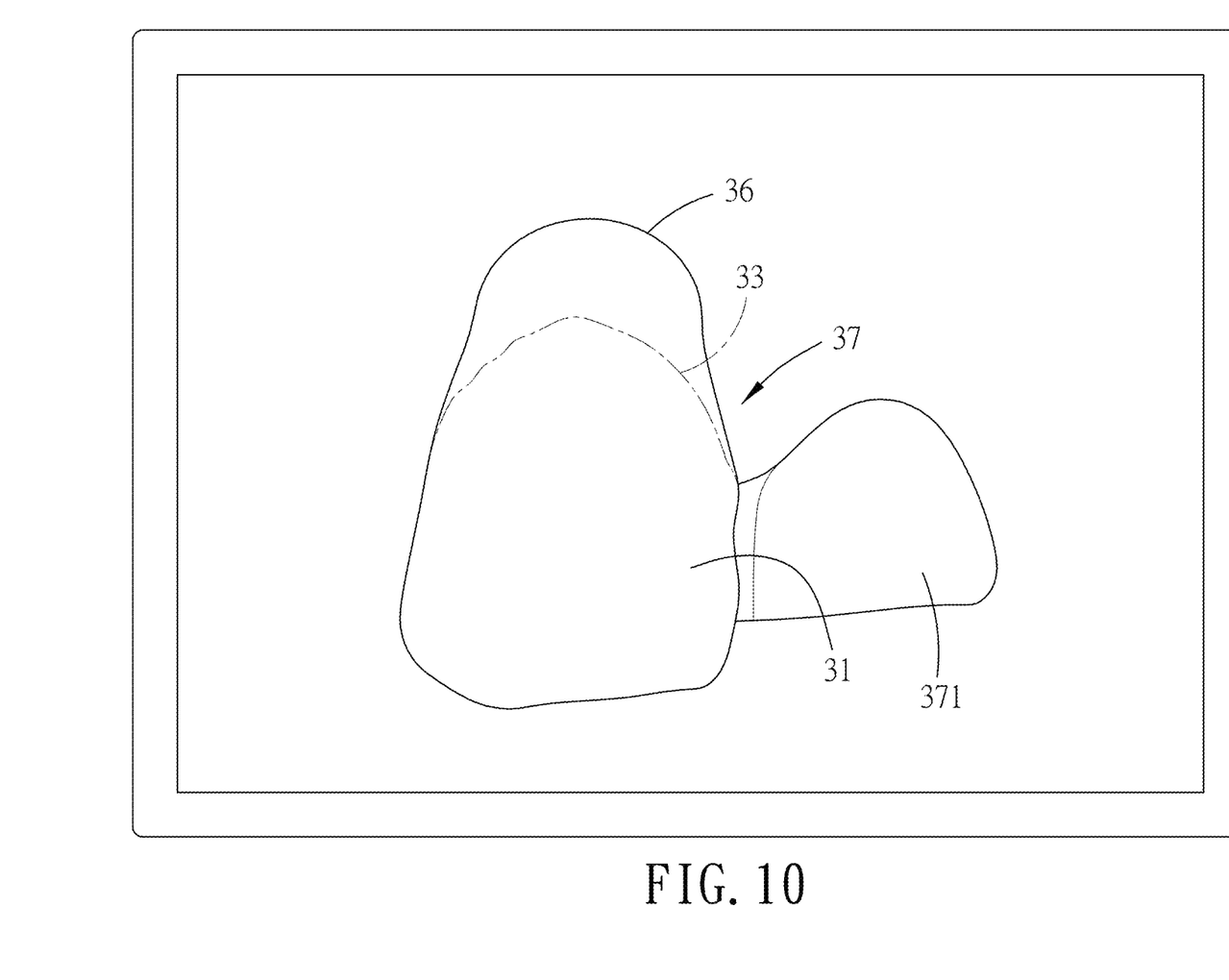
FIG. 10 is a schematic view of a sub-model extracted from the 3D virtual model connected with a wing.

Further referring to FIG. 10, the processing device 12, in step S5, extracts a sub-model 37 from the 3D virtual model 3 by removing a portion of the root part 32 that extends between the imaginary surface 36 and a terminal end of the root part 32. In step S6, the processing device 12 generates a wing 371 that is connected with and extends laterally from the sub-model 37.

Figure 11:
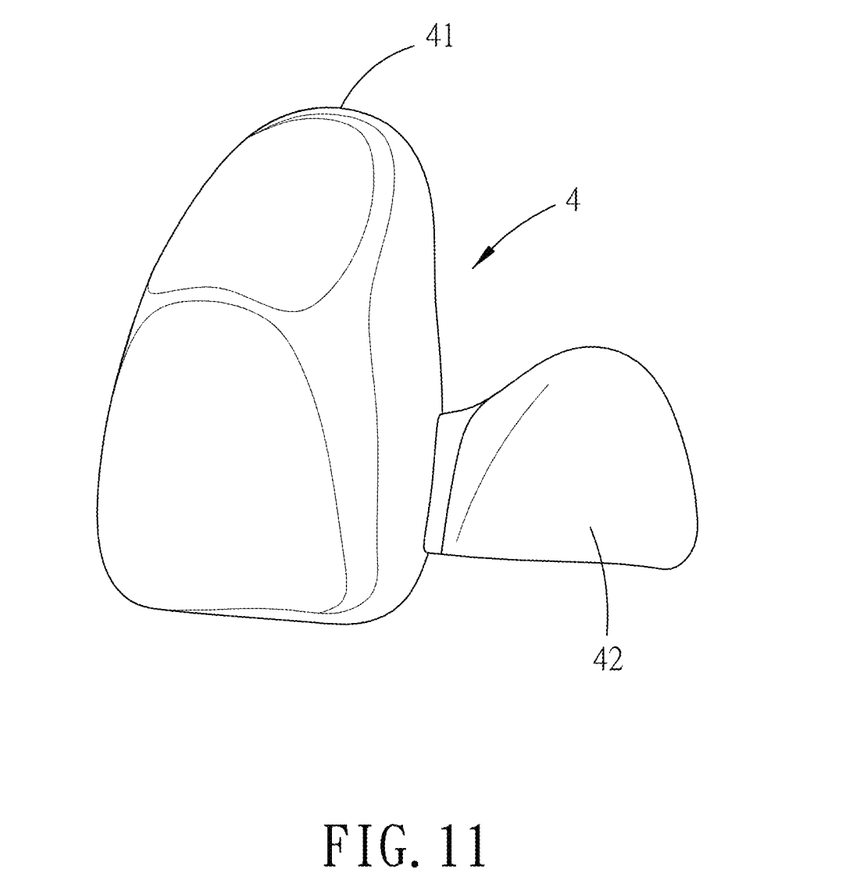
FIG. 11 is a schematic view of the dental adaptive element that is produced according to an embodiment of this disclosure.

Referring to FIG. 11, in step S7, the 3D forming equipment 13, which may be a 3D printer, a turning process machine or a molding machine, receives data related to the sub-model 37 connected with the wing 371, and produces a dental adaptive element 4 accordingly. The dental adaptive element 4 is made solid, and has a convex surface 41 and a wing portion 42 that correspond to the imaginary surface 36 of the 3D virtual model 3 and the wing 371, respectively. The materials for producing the dental adaptive element 4 may be, but not limited to, PMMA (polymethyl methacrylate) or ceramic materials.

Figure 2:
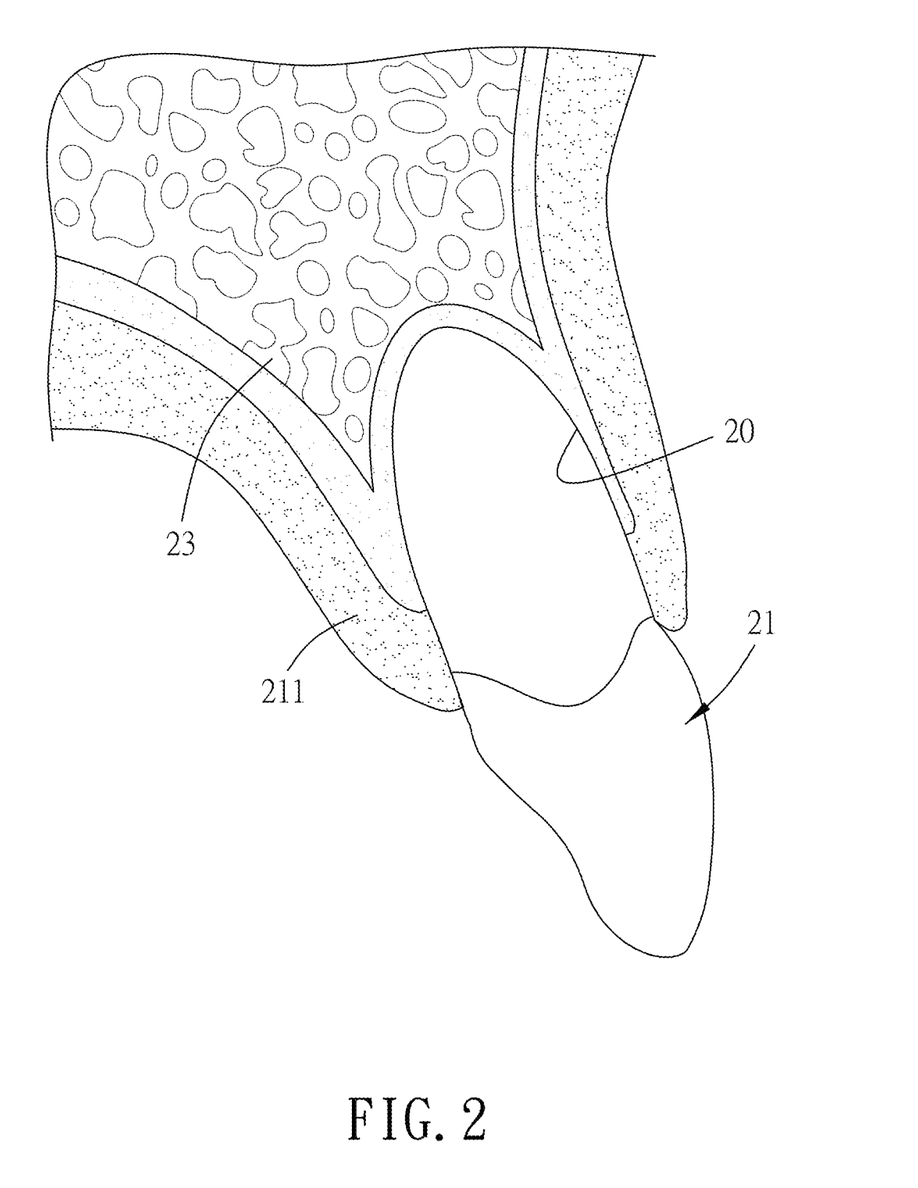
FIG. 2 is a schematic view of a to-be-treated tooth.
Figure 3:
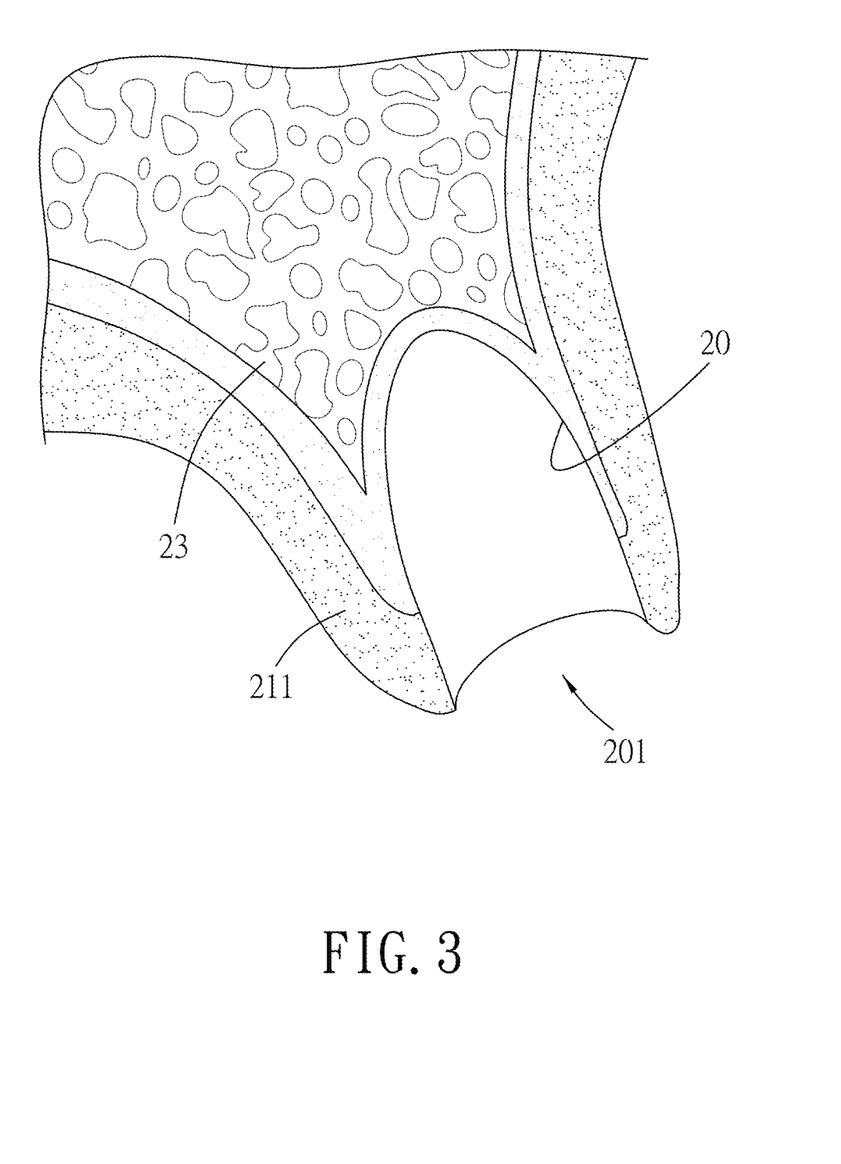
FIG. 3 is a schematic view of an alveolar socket after extraction of the to-be-treated tooth.
Figure 12:
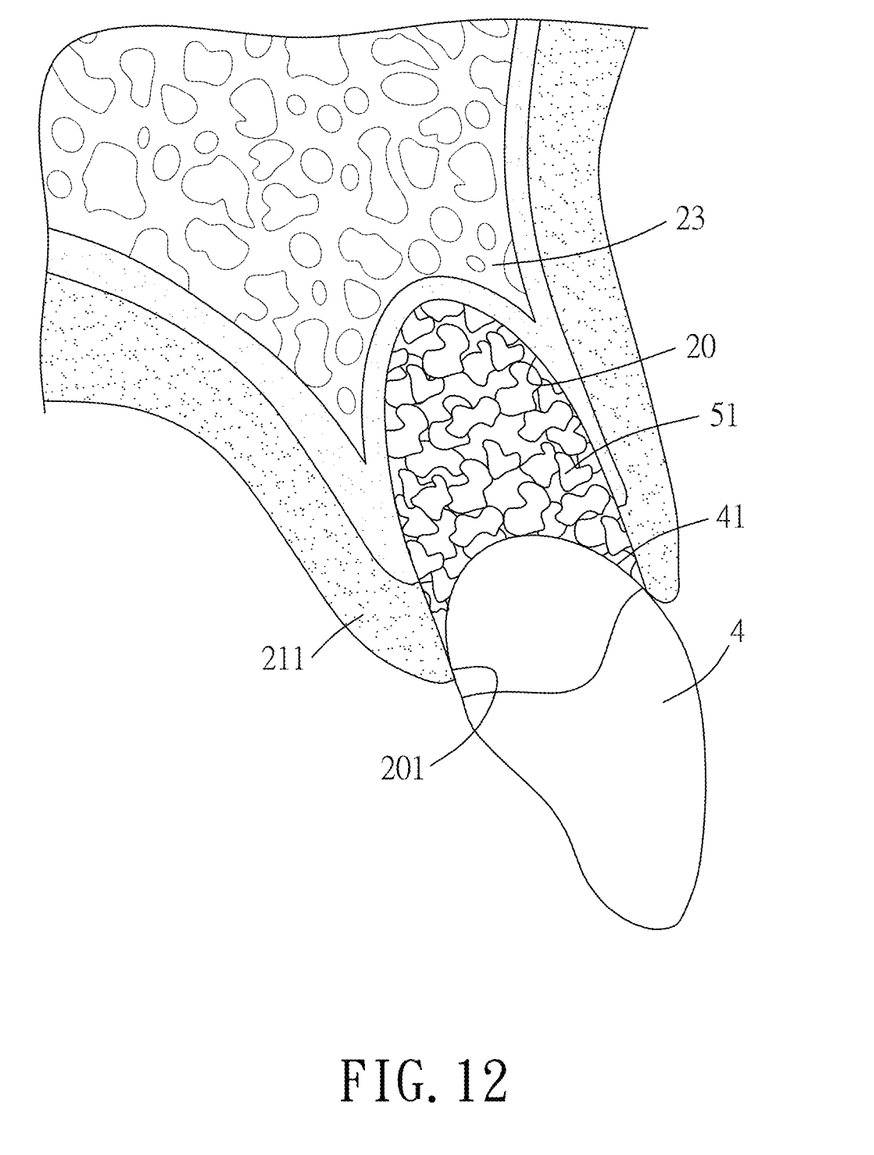
FIG. 12 is a schematic view illustrating bone graft material filled in the alveolar socket and the dental adaptive element placed at an opening of the alveolar socket.
Figure 13:
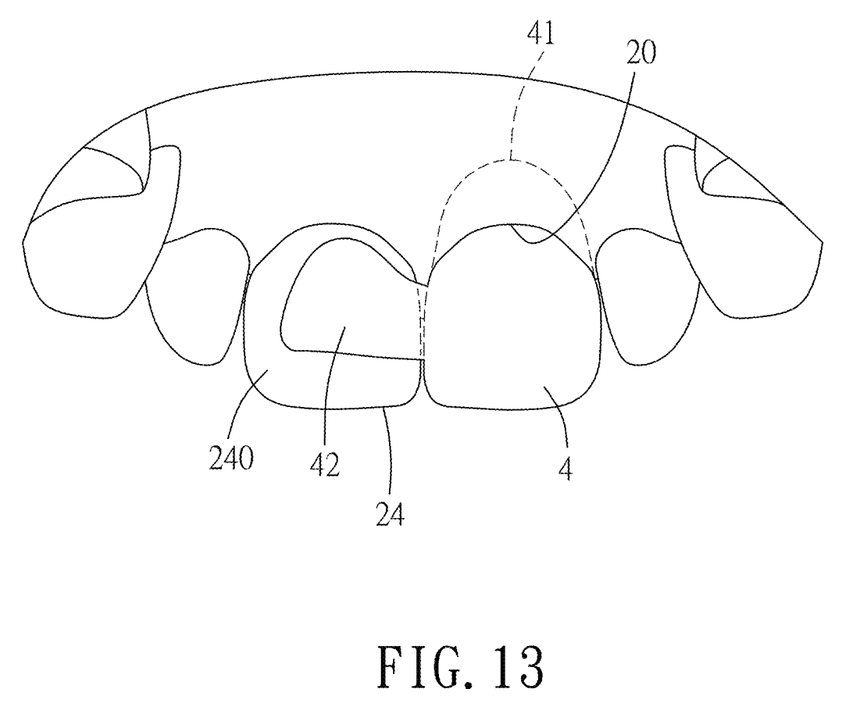
FIG. 13 is a schematic view illustrating the adaptive element having a wing portion bound to a lingual surface of an adjacent tooth.

Referring to FIGS. 12 and 13, a dentist may conduct bone grafting by filling bone graft material 51, such as hydroxyapatite bone powder, in the alveolar socket 20 immediately after the extraction of the to-be-treated tooth 21 (see FIG. 2). Then, the dental adaptive element 4 may be put partially into the alveolar socket 20 to block the opening 201 of the alveolar socket 20, with the convex surface 41 pressing against the bone graft material 51, and the wing portion 42 attached to a lingual surface 240 of an adjacent tooth 24. It is noted that the lingual surface is the opposite side of a facial surface of the tooth. There is no need to stitch wounds at the alveolar socket 20.

In this way, the alveolar bone 23 and the gingiva 211 of the patient can be pressed by the bone graft materials 51 and the dental adaptive element 4, so as to alleviate recession of the gingiva 211 and the alveolar bone 23. Around two months later, new bone tissue will have been formed in the alveolar socket 20 and have a shape that corresponds to the convex surface 41 of the dental adaptive element 4. Since the dental adaptive element 4 is customized according to the shape of the to-be-treated tooth 21, the dental adaptive element 4 can ideally be a perfect fit for the opening 201 of the alveolar socket 20, and can maintain the appearance of the gingiva 211 very well.

Figure 14:
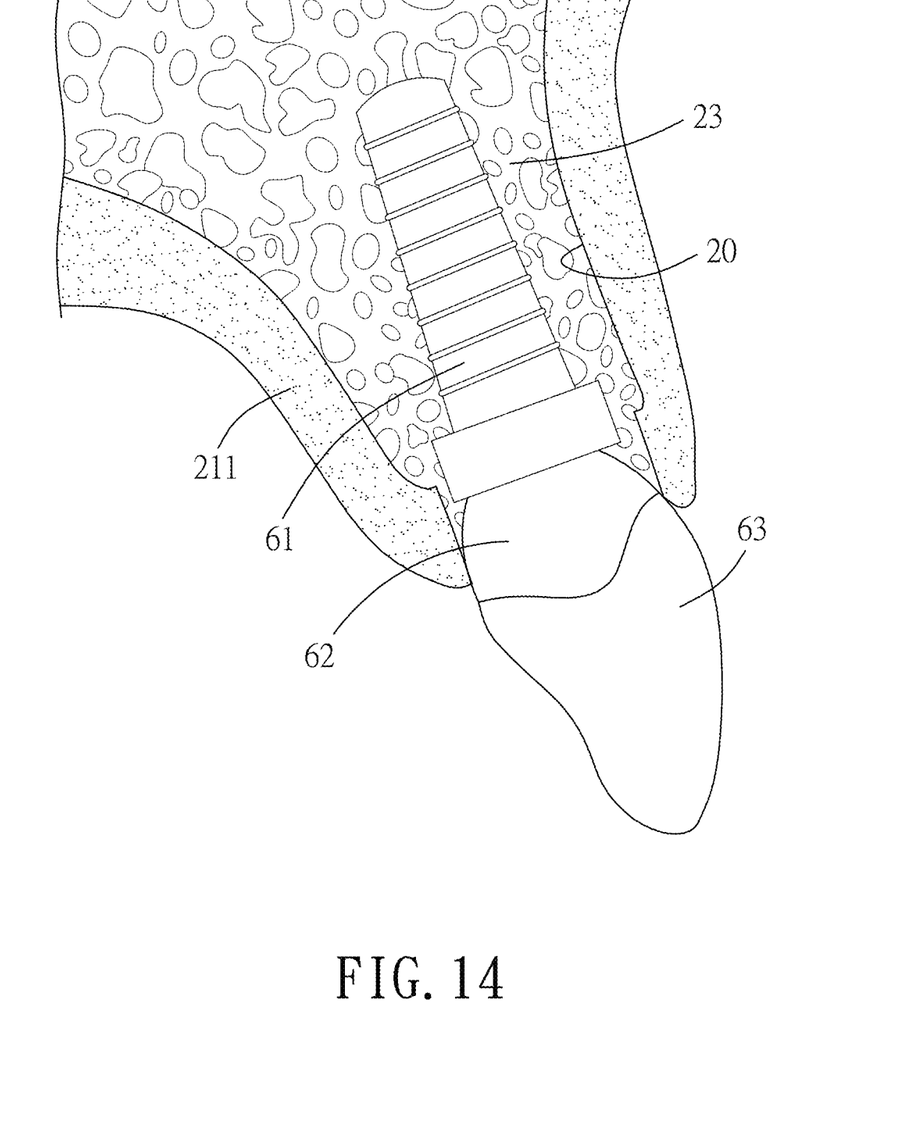
FIG. 14 is a schematic view illustrating a dental implant.

Referring to FIG. 14, when the new bone tissue is formed and integrated with the alveolar bone 23, a dental implant fixture 61 can be interfaced with (implanted and bonded with) the alveolar bone 23. A dental implant abutment 62 which may be produced according to the dental adaptive element 4, is mounted on the dental implant fixture 61. Further, a prosthetic crown 63 which may be produced according to the shape of the dental abutment 62 is then bonded to the dental implant abutment 62 by cementing or screwing. The dental implant fixture 62, the dental implant abutment 62 and the prosthetic crown 63 cooperatively form a dental implant. This way, the prosthetic crown 63 and the dental implant abutment 62 fit the gingiva 211 well, and the dental implant looks natural as if it is a real tooth that cuts through the gingiva 211.

In the cases that there is a missing tooth, even if the alveolar bone 23 and the gingiva 211 have receded, the dental adaptive element 4 can still be placed in the location of the missing tooth after a repairing surgery and can function effectively.

Moreover, the dental adaptive element 4 may come without the wing portion 42 and may be combined with two retainers to form a dental bridge while serving as a pontic. In the case that the patient decides to insert an artificial tooth or a dental bridge instead of a dental implant, applying the dental adaptive element 4 before the insertion of an artificial tooth or a dental bridge may shape the gingiva 211 for better and smoother insertion of the artificial tooth or the dental bridge.

In summary, in the embodiments of this disclosure, the 3D virtual model 3 is constructed based on 3D images of the target tooth (i.e., the to-be-treated tooth 21 or the symmetric tooth 22 symmetric to a missing tooth) of the patient, the sub-model 37 is obtained from the 3D virtual model 3, and the dental adaptive element 4 is then produced according to the sub-model 37. Thus, the dental adaptive element 4 may be applied to the opening 201 of the alveolar socket 20 and have a good fit therewith. Thus, the dental adaptive element 4 can ideally alleviate the recession of the gingiva 211.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment (s) but is intended to cover various arrangements included within the spirit and scope of the broadest interpretation so as to encompass all such modifications and equivalent arrangements.

What is claimed is:

1. A method for producing a dental adaptive element for alleviating recession of gingiva around an alveolar socket of a patient, the method comprising steps of:
   obtaining, by a scanning equipment, images of a target tooth of the patient that is related to the alveolar socket;
   creating, by a processing device, a three-dimensional (3D) virtual model based on the images of the target tooth, the 3D virtual model including a crown part and a root part connected to the crown part;
   obtaining, by the processing device, a boundary curve between the crown part and the root part on the 3D virtual model;
   obtaining, by the processing device, an imaginary surface on the root part of the 3D virtual model with reference to the boundary curve, the imaginary surface protruding in a direction from the crown part toward the root part;
   extracting, by the processing device, a sub-model from the 3D virtual model by removing a portion of the root part that extends between the imaginary surface and a terminal end of the root part; and
   producing, by a 3D forming equipment, the dental adaptive element according to the sub-model;
   wherein the step of obtaining an imaginary surface includes steps of:
      obtaining a tangent line that touches a reference point of the boundary curve and that is perpendicular to a vertical axis of the 3D virtual model, the reference point being an extremity of the boundary curve;
      obtaining a cross section that is aligned with the tangent line and that is perpendicular to the vertical axis; and
      defining a surface that protrudes from the cross section as the imaginary surface.

2. The method as claimed in claim 1, wherein the vertical axis is defined in coronal and apical directions of the 3D virtual model, and passes a centroid of the 3D virtual model.

3. The method as claimed in claim 1, wherein the reference point is defined as an extremity of the boundary curve on a facial surface of the 3D virtual model.

4. The method as claimed in claim 1, further comprising, after extracting the sub-model, a step of:
   generating a wing that is connected with and that extends laterally from the sub-model;
   wherein the step of producing a dental adaptive element is to produce the dental adaptive element further according to the wing.

5. The method as claimed in claim 1, wherein the step of obtaining images of a target tooth is to obtain 3D images of the target tooth by a cone beam computed tomography (CBCT) system.

6. The method as claimed in claim 1, wherein the step of producing a dental adaptive element includes producing the dental adaptive element using one of a 3D printer, a turning process machine and a molding machine.

7. The method as claimed in claim 1, wherein the step of obtaining a boundary curve includes obtaining the boundary curve based on a plurality of points that are marked on the 3D virtual model.

8. The method as claimed in claim 1, wherein the step of creating a 3D virtual model includes creating an initial 3D model of the target tooth based on the images of the target tooth, and creating a mirrored copy of the initial 3D model to serve as the 3D virtual model.

* * * * *